United States Patent
Collins et al.

(10) Patent No.: US 6,322,915 B1
(45) Date of Patent: Nov. 27, 2001

(54) HUMIDIFICATION SYSTEM FOR A FUEL CELL POWER PLANT

(75) Inventors: William P. Collins, South Windsor; Leslie L. Van Dine, Manchester, both of CT (US)

(73) Assignee: International Fuel Cells LLC, South Windsor, CT (US)

( * ) Notice: Subject to any disclaimer, the term of this patent is extended or adjusted under 35 U.S.C. 154(b) by 0 days.

(21) Appl. No.: 09/357,259

(22) Filed: Jul. 20, 1999

(51) Int. Cl.[7] .............................. H01M 8/02; H01M 8/04; H01M 8/10
(52) U.S. Cl. ................... 429/13; 429/25; 429/26; 429/30; 429/34; 429/38; 429/39
(58) Field of Search .................. 429/13, 25, 26, 429/30, 34, 38, 39

(56) References Cited

U.S. PATENT DOCUMENTS

| | | | |
|---|---|---|---|
| 5,230,966 | * 7/1993 | Voss et al. | 429/26 |
| 5,547,776 | 8/1996 | Fletcher et al. | 429/13 |
| 5,700,595 | 12/1997 | Reiser | 429/13 |
| 5,773,160 | 6/1998 | Wilkinson et al | 429/13 |
| 5,922,485 | * 7/1999 | Enami | 29/26 |

FOREIGN PATENT DOCUMENTS 61-126772 * 6/1986 (JP).
8-329960 * 12/1996 (JP).

* cited by examiner

Primary Examiner—Stephen Kalafut
Assistant Examiner—Jonathan Crepeau
(74) Attorney, Agent, or Firm—Malcolm J. Chisholm, Jr.

(57) ABSTRACT

The invention is a humidification system for a fuel cell power plant. The system includes at least one fuel cell comprising a coolant flow field adjacent the cathode flow field. The coolant flow field includes a coolant inlet, a coolant outlet, and a split-path coolant distribution channel between the coolant inlet and outlet. The split-path distribution channel directs some of the coolest portion of the coolant stream to flow adjacent the cathode inlet and some of the coolest portion to flow adjacent the cathode outlet. The humidification system lowers a temperature of the process oxidant stream adjacent the cathode inlet, thereby increasing relative humidity of the stream in the cathode flow field adjacent the cathode inlet.

16 Claims, 5 Drawing Sheets

HUMIDIFICATION SYSTEM FOR A FUEL CELL POWER PLANT

TECHNICAL FIELD

The present invention relates to fuel cell power plants that are suited for usage in transportation vehicles, portable power plants, or as stationary power plants, and the invention especially relates to a humidification system for a fuel cell power plant that increases relative humidity of a process oxidant stream at an oxidant inlet of a fuel cell of the plant.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is the aforesaid proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention. As is well-known however, PEM cells have significant limitations especially related to liquid water transport to, through and away from the PEM, and related to simultaneous transport of gaseous reducing fluids and process oxidant fluids to and from the electrodes adjacent opposed surfaces of the PEM. The prior art includes many efforts to minimize the effect of those limitations.

In operation of PEM fuel cells, the membrane is saturated with water, and the anode electrode adjacent the membrane must remain wet. As hydrogen ions produced at the anode electrode transfer through the electrolyte, they drag water molecules in the form of hydronium ions with them from the anode to the cathode. Water also transfers back to the anode from the cathode by osmosis. Product water formed at the cathode electrode is removed from the cell by evaporation or entrainment into a circulating gaseous stream of either the process oxidant or reducing fluid. It is critical that a proper water balance be maintained between a rate at which water is produced at the cathode electrode and rates at which water is supplied to and removed from both electrodes. An operational limit on performance of a fuel cell is defined by an ability of the cell to maintain the water balance as electrical current drawn from the cell into the external load circuit varies and as an operating environment of the cell varies. For PEM fuel cells, if insufficient water is returned to the anode electrode, adjacent portions of the PEM electrolyte dry out thereby decreasing the rate at which hydrogen ions may be transferred through the PEM and also resulting in cross-over of the reducing fluid leading to local over heating. Similarly, if insufficient water is removed from the cathode, the cathode electrode may become flooded effectively limiting oxidant supply to the cathode and hence decreasing current flow. Additionally, if too much water is removed from the cathode by the gaseous stream of oxidant, the cathode may dry out limiting ability of hydrogen ions to pass through the PEM, thus decreasing cell performance, and limiting a useful life of the PEM.

In fuel cell power plants, preventing localized dry-out of the PEM is additionally complicated because the process oxidant is typically air, and therefore subject to varying relative humidity depending upon environmental conditions in which the plant is operated. Process oxidant air enters an operating fuel cell of the plant through a cathode inlet and then flows through a cathode flow field adjacent the cathode electrode, and out of the fuel cell through a cathode outlet. As the fuel cell operates, heat is generated at the cathode, and therefore the temperature of a process oxidant stream immediately rises as it enters the cathode inlet. That results in a drop of the relative humidity of the oxidant stream, which facilitates movement of water out of the PEM and into the oxidant stream adjacent and downstream of the cathode inlet.

It is well-known to use a cooling component adjacent the process oxidant stream for cooling the stream and thereby raising the relative humidity of the stream in order to minimize water movement out of the PEM and into the process oxidant stream. For example, U.S. Pat. No. 5,547,776 issued on Aug. 20, 1996 to Fletcher et al. shows use of a series of inactive humidification cells that utilize a water transport membrane to humidify fuel and oxidant streams prior to entry into the active fuel cells wherein a sealed coolant plate is positioned adjacent an oxidant flow field to direct an isolated coolant stream to cool the oxidant as it passes through the cell, and to remove heat from the cell. That approach provides a long, complicated and serpentine flow path for the oxidant stream through the humidification cells and cathode flow field which may be effective for a fuel cell power plant that pressurizes the process oxidant stream, but is impractical for a fuel cell power plant operated at about ambient pressure.

Further attempts to maintain an electrolyte saturated with water while enhancing efficient movement of fluids to, through and away from the membrane have included adding porous water transport plates adjacent porous support layers within anode and cathode flow fields to facilitate liquid water transport and cooling throughout the cell; integrating a condensing loop external to the cell to condense moisture within an exiting oxidant stream such as by a heat exchange relationship with ambient air and then returning the condensed moisture to the porous support layers adjacent the anode electrode; rendering a portion of a non-PEM, phosphoric acid electrolyte electrochemically inactive in a phosphoric acid cell and thereby forming a condensation zone adjacent an oxidant gas outlet which zone operates at a cooler temperature than the active portions of the electrolyte to thereby limit electrolyte loss (as shown in U.S. Pat. No. 4,345,008 to Breault and assigned to the assignee of the present invention); and generating a pressure differential on the anode side of the cell wherein the reducing fluid or fuel is maintained at a slightly higher pressure than coolant water and anode supply water passing through porous support layers adjacent reducing gas distribution channels so that the pressure differential assists water transport through porous support layers and the PEM.

While such improvements have enhanced fuel cell efficiencies, PEM fuel cells still suffer operational limits such as when the process oxidant stream enters the cell at a low relative humidity so that water may be evaporated from of the PEM adjacent the cathode inlet and into the oxidant stream at a rate faster than water can be replaced into the PEM by osmosis from product water or by water from the anode side. Such loss of water by the PEM leads to decreased cell performance, shorter cell life, and possible reactant gas cross over. Accordingly there is a need for a fuel cell power plant that maintains a high relative humidity throughout the cell thus resulting in a water saturated PEM throughout anticipated operating environments of the plant.

DISCLOSURE OF THE INVENTION

A humidification system for a fuel cell power plant is disclosed that includes at least one fuel cell having an electrolyte between an anode electrode and a cathode electrode, a cathode flow field adjacent the cathode electrode extending between a cathode inlet and a cathode outlet for directing a process oxidant stream to pass adjacent the cathode electrode, a coolant flow field adjacent the cathode flow field, a pressure control means secured to a coolant line that supplies a coolant stream to the coolant flow field for maintaining a positive pressure differential between the process oxidant stream and the coolant stream, wherein the coolant flow field includes a coolant inlet, a coolant outlet, and coolant distribution means between the coolant outlet and inlet for directing at least some of a coolest portion of the coolant stream within the coolant flow field to flow adjacent to and along an entire length of the cathode inlet to lower a temperature of the fuel cell and to increase relative humidity of the process oxidant stream in the cathode flow field adjacent the cathode inlet.

In a first embodiment of the system, the coolant distribution means includes: the coolant inlet being defined in the coolant flow field adjacent the cathode inlet; a single-path coolant distribution channel defined within the coolant flow field that directs the coolest portion of the coolant stream in the coolant flow field to flow adjacent to and along the entire length of the cathode inlet; wherein the coolant flow field is defined in an at least partially porous plate to permit exchange of water between the process oxidant stream and the coolant stream, and to permit evaporation of water from the coolant flow field into the process oxidant stream.

In a second embodiment of the system, the coolant distribution means includes a split-path coolant distribution channel defined in the coolant flow field that directs some of the coolest portion of the coolant stream within the coolant plate to flow adjacent to and along the entire length of the cathode inlet, and that also directs some of the coolest portion of the coolant stream within the coolant flow field to flow adjacent to and along an entire length of the cathode outlet. In the second embodiment, the coolant flow field may be defined within a porous or sealed coolant plate. In a further embodiment of the system, the fuel cell includes an anode flow field extending between a fuel inlet and a fuel outlet, wherein the anode flow field includes fuel distribution means for directing a fuel stream to pass along a fuel flow path substantially across or orthogonal to an oxidant flow path of the process oxidant stream passing through the cathode flow field, and for directing the fuel stream adjacent the fuel inlet to pass adjacent the coolest portion of the coolant stream or to pass adjacent a portion of the coolant stream that is intermediate in temperature.

In operation of the present humidification system for a fuel cell power plant, as a process oxidant stream enters the cathode inlet, the coolant distribution means directs at least some of the coolest portion of the coolant stream to pass along the entire length of the cathode inlet, and therefore lowers the temperature of the oxidant stream, thus minimizing evaporation of water from a PEM electrolyte into the oxidant stream. By maintaining a positive pressure differential between the process oxidant stream and the coolant stream, the pressure control means serves to effectively pump product water generated at the cathode electrode away from the electrode, and where the coolant flow field is defined within a porous coolant plate, into the coolant stream within the coolant flow field. In a fuel cell with a porous coolant plate, the product water is removed from the cell as a liquid by flow across the porous coolant plate into the coolant stream as well as being removed as a vapor in the reactant streams exiting the cell. In a fuel cell with a non-porous or sealed coolant plate, the product water is removed from the cell as a vapor in the reactant streams exiting the cell, or as an entrained liquid in the reactant streams exiting the cell.

Adjacent the cathode inlet, upstream of the cathode electrode, water vapor moves from the porous coolant plate into the process oxidant stream to increase the relative humidity of the oxidant stream because of a higher partial pressure of water saturating the porous plate defining the coolant flow field than a partial pressure of water in the oxidant stream. To enhance humidification of the oxidant stream within the cell upstream of the cathode electrode, the cathode flow field may include a humidification zone, which is a portion of the PEM adjacent the cathode inlet that is uncatalyzed. The humidification zone permits the above described vaporization of water vapor from the porous plate defining the coolant flow field into the oxidant stream so that its relative humidity is increased prior to passing adjacent the cathode electrode, thereby further minimizing water loss from the PEM, until the oxidant stream starts to take up product water generated at the cathode electrode.

Where the coolant flow field is defined in a non-porous, sealed coolant plate, the positive pressure differential between the oxidant stream and the coolant stream serves to restrict leakage of the coolant, such as an anti-freeze liquid, into the oxidant stream, thereby minimizing any possibility of contamination of the electrodes, or other cell components by any anti-freeze fluids. For a fuel cell power plant operating at near ambient pressure it is preferred that the reactants be pressurized to 1 to 2 p.s.i.g. above ambient pressure, and the coolant stream is controlled to be about 1 to 2 p.s.i.g. below ambient pressure. Where the coolant distribution means within the coolant flow field directs some of the coolest portion of the coolant stream to pass adjacent to and along an entire length of the cathode outlet, water vapor in the oxidant stream leaving the cell is cooled resulting in increased condensation of water vapor in the stream, which facilitates recovery of that condensed water for use in other components of the fuel cell power plant, such as in the coolant stream, or in fuel processing components.

Accordingly, it is a general object of the present invention to provide a humidification system for a fuel cell power plant that overcomes deficiencies of the prior art.

It is more specific object to provide a humidification system for a fuel cell power plant that enhances a relative humidity of a process oxidant stream entering fuel cells of the plant.

It is yet another object to provide a humidification system for a fuel cell power plant that enhances the relative humidity of the process oxidant stream without need of direct addition to the process oxidant stream of steam and/or water other than from a coolant flow field of the plant.

It is another object to provide a humidification system for a fuel cell power plant that restricts leakage of liquid coolant from sealed coolant plates into the process oxidant stream.

It is still a further object to provide a humidification system for a fuel cell power plant that facilitates condensation and recovery of product water leaving the fuel cells.

These and other objects and advantages of this invention will become more readily apparent when the following description is read in conjunction with the accompanying drawings.

DESCRIPTION OF THE PREFERRED EMBODIMENTS

Figure 1:
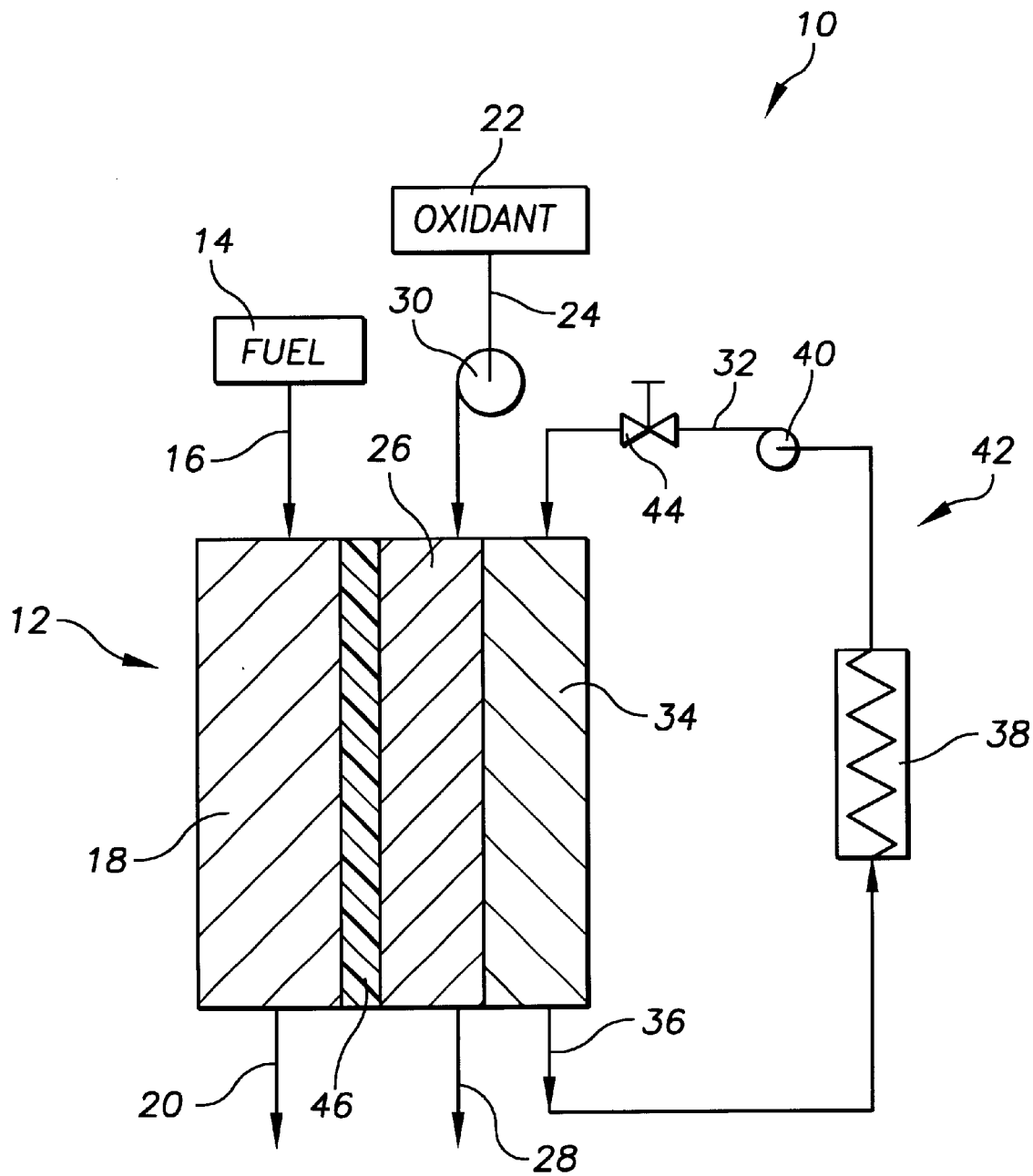
FIG. 1 is a schematic representation of a humidification system for a fuel cell power plant constructed in accordance with the present invention.

Referring to the drawing in detail, a humidification system for a fuel cell power plant of the present invention is best shown in FIG. 1 and is generally designated by the reference numeral 10. The system 10 includes at least one fuel cell means for producing electrical energy from a reducing fluid and a process oxidant stream, such as fuel cell 12. The reducing fluid is directed from a fuel supply component 14 (labelled "FUEL" in FIG. 1 for convenience) through a fuel passage 16 into the fuel cell 12 to pass through an anode flow field 18 of the cell 12, and out of the cell through a reducing fluid vent 20. The process oxidant stream is directed from an oxidant supply component 22 through an oxidant passage 24 to pass through a cathode flow field 26 of the cell 12, and out of the cell through an oxidant vent 28. An oxidant blower 30 may be positioned on the oxidant passage 24 to variably accelerate flow of gaseous oxidant into the fuel cell 12. It is stressed, however, that such a blower is of a capacity to only slightly increase operating pressures of the oxidant to a range of from atmospheric pressure to about 1.0 P.S.I. above atmospheric pressure, or from about 14.7 P.S.I.A. to about 15.7 P.S.I.A.

A coolant fluid such as liquid water is directed through a coolant feed line 32 into a coolant flow field 34 of the fuel cell 12 adjacent the cathode flow field 34, and out of the cell 12 in a coolant discharge line 36. The coolant discharge line 36 and coolant feed line 32 may be in fluid communication with a coolant heat exchanger 38 to cool the coolant fluid, such as a radiator type of heat exchanger common to automobiles. A coolant pump 40 may be secured to the coolant feed line 32 to pump the coolant liquid into the coolant flow field 34, coolant discharge line 36, and coolant heat exchanger 38. When the coolant feed line 32, coolant flow field 34, coolant discharge line 36 and coolant heat exchanger 38 are in fluid communication as shown schematically in FIG. 1, the components may be characterized as forming a coolant loop 42, wherein the coolant liquid is described as a coolant stream cycling through the coolant loop 42, as is common and well-known in the art. For purposes of the description herein, the phrase "fuel cell power plant" is meant to include the fuel cell 12, coolant loop 42, reducing fluid and oxidant supply components 14, 22, passage 16, 24 and related components described herein.

The fuel cell power plant includes a pressure control means for maintaining a positive pressure differential between the process oxidant stream delivered to the fuel cell 12 within the cathode flow field 26 and the coolant stream delivered to the cell 12 within the coolant flow field 34. The pressure control means may include the coolant pump 40 coordinated with a pressure control valve means for maintaining a specific pressure of the coolant stream within the coolant feed line 32 down stream of the valve means, coolant flow field 34, and coolant discharge line 36, such as a pressure control valve 44 secured to the coolant inlet line 32 between the pump 40 and the coolant flow field 34. As is well-known, the pressure control valve 44 may be set manually, automatically, or, for example, may be electro-mechanically adjusted based upon a reference pressure within the process oxidant stream within the cathode flow field 34 to restrict flow through the valve 44 so that the coolant stream drawn into the coolant pump 40 from the coolant feed line 32, coolant flow field 34, coolant discharge line 36 and coolant heat exchanger is at a pressure lower than the pressure of the process oxidant stream within the cathode flow field. Additional pressure control means for purposes herein include any well-known mechanism that can reduce pressure of a liquid stream below a reference pressure of a gaseous stream, such as disclosed in U.S. Pat. No. 5,700,595, issued on Dec. 23, 1997 to Reiser and assigned to the assignee of the present invention, which patent is hereby incorporated herein by reference. The materials making up the coolant loop 42 may be manufactured of standard materials well known in the art such as heat exchangers common to automobile technology, and piping and valving well-known in the aircraft manufacture arts, etc.

The fuel cell 12 also includes a membrane electrode assembly 46 (hereafter "M.E.A.") that facilitates an electrochemical reaction involving the reducing fluid and oxidant stream to generate electrical energy that is conducted through a standard circuit to an energy consuming load, such as an electric motor (not shown) to power, for example a transportation vehicle (not shown). As is well known, it is common to enclose the fuel cell in a frame structure with a plurality of similar fuel cells (not shown) to form a cell stack assembly enclosed within the frame structure that defines manifolds for directing the reducing fluid stream and process oxidant stream into and out of the fuel cell 12 in a manner well-known in the art.

Figure 2:
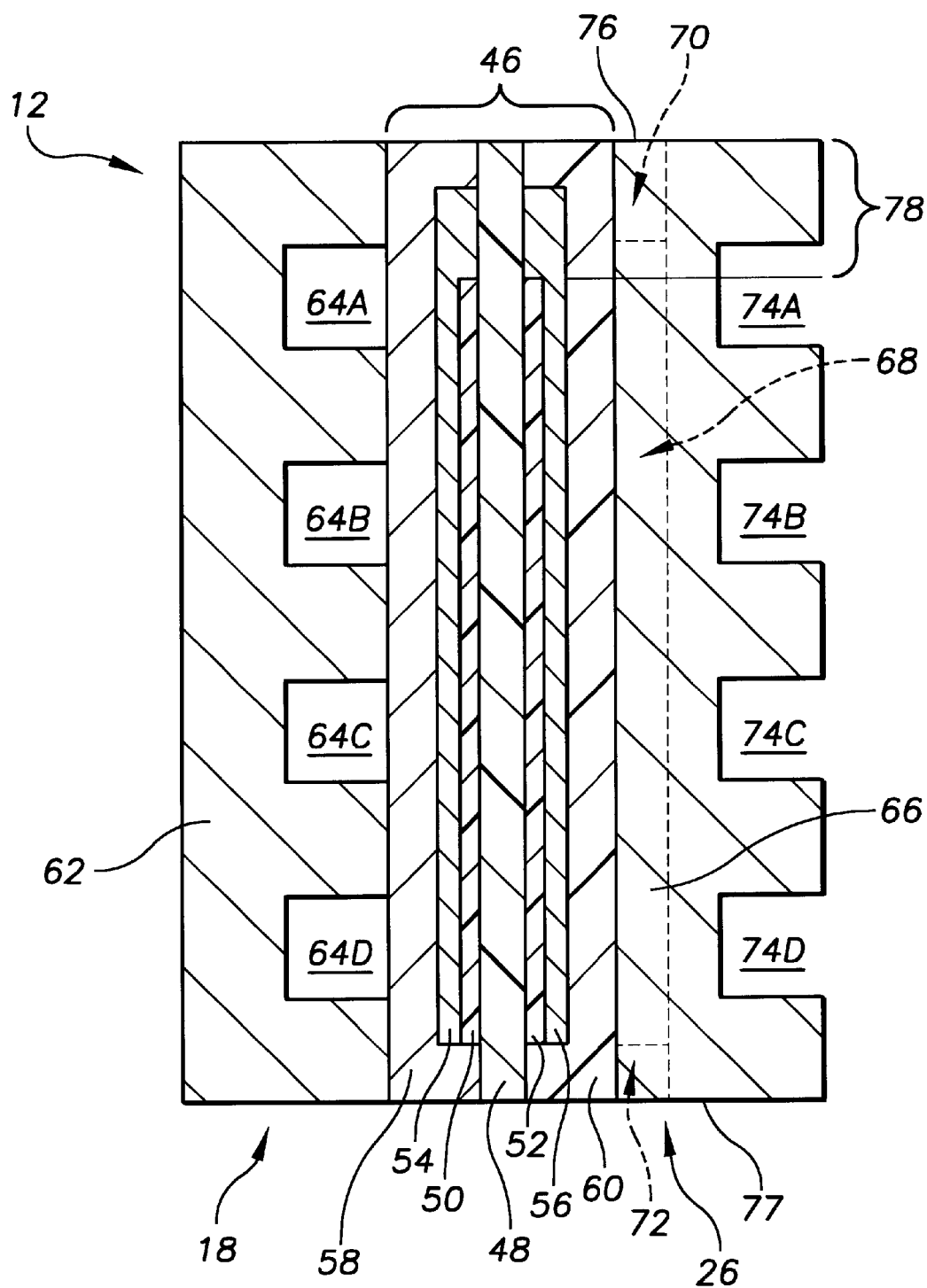
FIG. 2 is a schematic, cross-section of fuel cell components of a fuel cell of the present humidification system showing a coolant flow field defined within a porous plate adjacent a cathode flow field.

The M.E.A. 46 is shown in greater detail in FIG. 2, and includes an electrolyte 48 such as a proton exchange membrane ("PEM"), an anode electrode or anode catalyst 50 and a cathode electrode or cathode catalyst 52 on opposed sides of the electrolyte 48. An anode diffusion layer 54 is positioned adjacent the anode catalyst, and a cathode diffusion layer 56 is positioned adjacent the cathode electrode 52. An anode substrate 58 is secured adjacent the anode diffusion layer 54, and a cathode substrate 60 is secured adjacent the cathode diffusion layer 56. The anode diffusion layer 54 and anode substrate 58 may be fine pore plates dimensioned to facilitate movement of the reducing fluid and water to the anode catalyst, and similarly the cathode diffusion layer 56 and cathode substrate 60 may likewise be fine pore plates dimensioned to facilitate movement of the process oxidant stream by the cathode catalyst 52, and movement of product water from the cathode catalyst into the oxidant stream. Such fine pore plates may be fabricated of carbon fiber or other materials well known in the art.

The humidification system 10 may utilize an embodiment of the fuel cell 12 wherein the anode flow field 18 is formed by a porous anode flow field plate 62 shown in FIG. 2 that defines a plurality of fuel channels 64A, 64B, 64C, 64D for delivery of the reducing fluid to the anode substrate 58, anode diffusion layer, 54 and anode catalyst 50. Similarly, the cathode flow field 26 may be a porous cathode flow field plate 66 that defines an oxidant passage 68 (shown in hatched lines in FIG. 2) extending between a cathode inlet 70 and cathode outlet 72. In the embodiment shown in FIG. 2, the cathode flow field plate 66 may also include a plurality of coolant flow channels 74A, 74B, 74C, 74D that define part of the coolant flow field 34.

As shown in FIG. 2, the humidification system for a fuel cell power plant 10 includes the electrolyte 48 extending between an entry edge 76 of the cathode inlet 70 to an exit edge 77 of the cathode outlet 72. However, the cathode catalyst 52 does not cover the entire electrolyte 48 and in particular does not extend to the entry edge 76 of the cathode inlet 72 and extends only to a point between the entry edge 76 of the cathode inlet 70 and the cathode outlet 72. The area of the cathode flow field 26 that substantially overlies the portion of the electrolyte 48 extending from the cathode catalyst 52 to the entry edge 76 of the cathode inlet 70 is referred to herein as a humidification zone 78 of the cathode flow field 26. Because the humidification zone 78 includes a portion of the electrolyte that does not have the cathode catalyst 52 in intimate contact with the electrolyte, no electrochemical activity takes place, and therefore no heat is generated. Consequently, the oxidant stream passing into the humidification zone 78 from the oxidant passage 24 will require less cooling and/or less additional water to increase the relative humidity of the oxidant stream. Where the electrolyte is a PEM, it is common to apply a layer of catalyst to either a surface of the PEM electrolyte 48 or to a surface of the porous cathode diffusion layer 56. In such an embodiment, the humidification zone 78 would also be referred to as substantially overlying an uncatalyzed area of the electrolyte 48 between the entry edge 76 of the cathode inlet 72 and the cathode catalyst 52.

FIG. 2 shows essential features of an embodiment of the fuel cell 12 appropriate for use in the humidification system 10 of the present invention. For facilitating understanding, it is pointed out that if the fuel cell 12 shown in FIG. 2 were secured with a plurality of similar cells, a second anode flow field plate (not shown) of such a similar adjacent cell that would be substantially identical to the anode flow field plate 62 of cell 12 would be positioned adjacent the coolant flow channels 74A, 74B, 74C, 74D, as is well known in the art, and is also described in the aforesaid U.S. Pat. 5,700,595 to Reiser.

Figure 3:
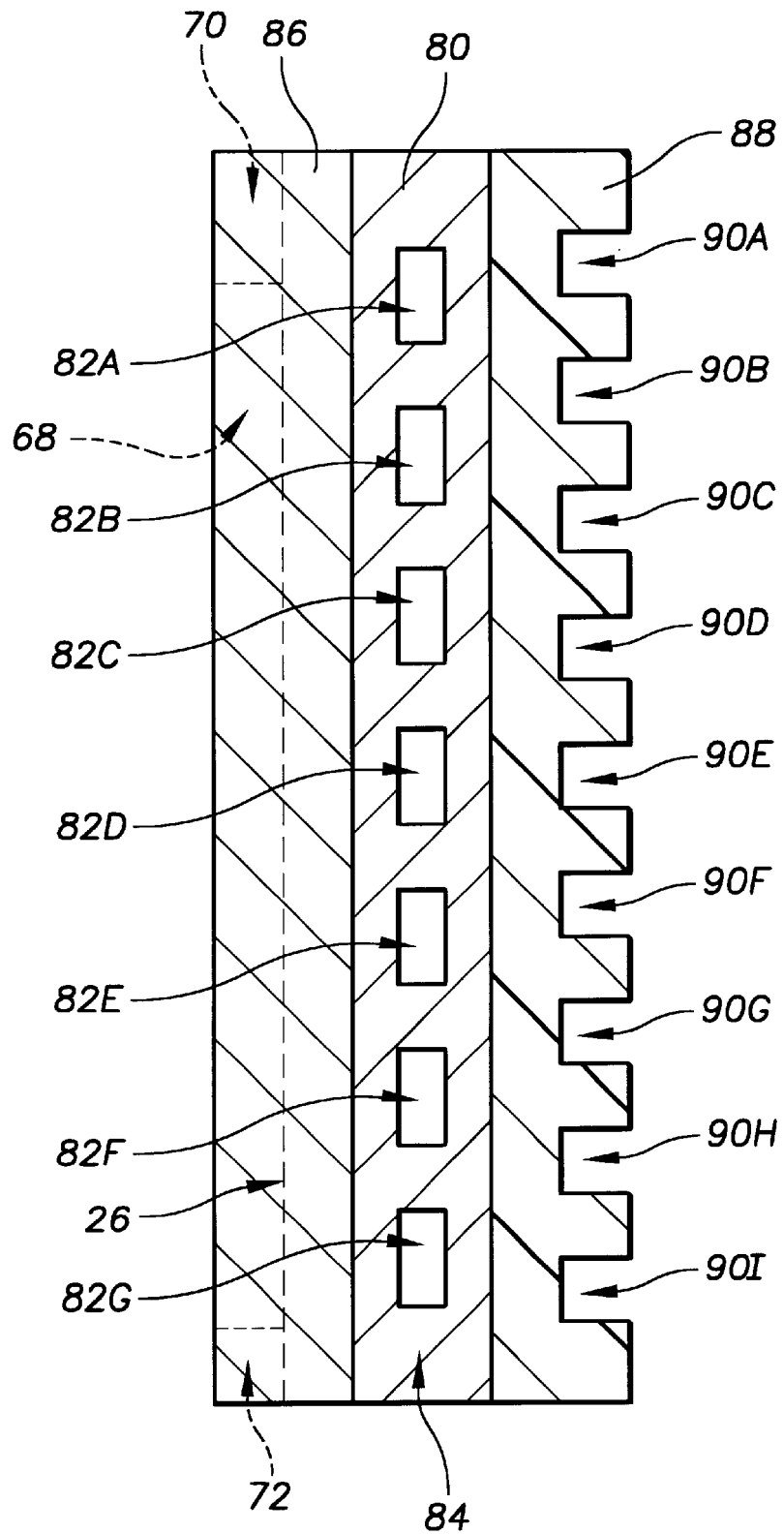
FIG. 3 is a schematic, cross-section of an alternative, sealed coolant plate adjacent a cathode flow field.

FIG. 3 shows an alternative embodiment of fuel cell components of the humidification system 10 for a fuel cell power plant, wherein the coolant flow field is defined within a sealed coolant plate 80, having a plurality of sealed coolant flow channels 82A, 82B, 82C, 82D, 82E, 82F, 82G that serve to define part of a sealed coolant flow field 84. The sealed coolant plate 84 restricts flow of the coolant stream within flow channels, so that the coolant cannot pass into the oxidant stream or reducing fluid, and fluids may not move from the oxidant or reducing fluid streams into the sealed coolant plate. Such a sealed coolant plate 84 may be utilized where it is desired to employ an anti-freeze liquid in the coolant stream, or any other fluid in the coolant stream that might impair performance of the M.E.A. 46. In the FIG. 3 embodiment, the cathode flow field 26 includes the cathode inlet 70, the oxidant passage 68 being defined within a second cathode flow field plate 86 that may be a porous or solid plate, and the cathode outlet 72. If the second cathode flow field plate is porous, the cathode flow field 26 includes the pore volume of the plate 86, and if the plate 86 is solid, the cathode flow field is defined by the oxidant passage 68. Because the sealed coolant plate restricts movement of the coolant stream out of the plate, a second anode flow field plate 88 may be required, which defines second fuel flow channels 90A, 90B, 90C, 90D, 90E, 90F, 90G, 90H, 90I and the second anode flow field plate may be a porous or a solid plate.

FIGS. 4–7 show four embodiments of the humidification system 10 for a fuel cell power plant having four variations of the FIG. 1 coolant flow field 34, all of which variations of the coolant flow field include a coolant distribution means for directing at least some of a coolest portion of the coolant stream within the coolant flow field to pass adjacent an entire length of the cathode inlet 70. For purposes herein the phrase "length of the cathode inlet" 70 means a dimension of the cathode inlet 70 that defines a length axis passing through the cathode inlet 70 which length axis is parallel to a length axis of the cathode catalyst 52 passing through a shortest distance across the cathode catalyst 52 and perpendicular to flow of the oxidant stream through the cathode flow field 34 from the cathode inlet 70 to the cathode outlet 72, as shown in FIG. 2. In other words, the cathode inlet 70 has essentially three axial dimensions; a width, running in a direction that is a shortest distance between the cathode flow field 34 and anode flow field 18; a depth, running in a direction that is a shortest distance from the entry edge 76 of the cathode inlet to the cathode outlet 72; and the aforesaid length of the cathode inlet 70. For purposes herein, whenever the phrase "the entire length of the cathode inlet" is used, it means that the length of the cathode inlet 70 is about the same as a length of the length axis passing through the cathode catalyst 52.

Figure 4:
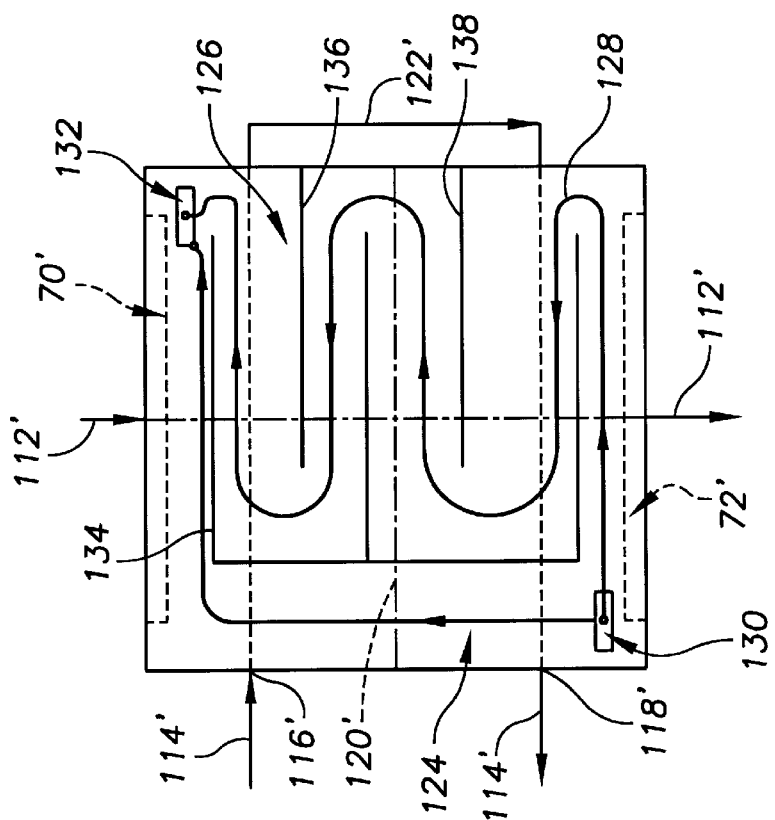
FIG. 4 is a schematic, cross-section of a first coolant flow field showing a single-path coolant distribution channel directing flow of a coolant stream through the first coolant flow field, and showing in hatched lines an oxidant flow path and a fuel flow path.

In FIG. 4, the cathode inlet 70 is shown in hatched lines, and reference number 92 shows a length axis of the cathode inlet 70. The cathode catalyst 52 is also shown schematically in hatched lines, and reference number 94 shows a length axis of the cathode catalyst 52. It is apparent that the cathode inlet 70 and cathode catalyst 52 have length axes of approximately the same length. It is stressed that whenever the humidification system 10 of the present system is utilized with a fuel cell operating at about ambient pressure, minimal restrictions are placed on flow of the oxidant to and through the cell, and therefore having a cathode inlet with a length approximately the same as a length of the cathode catalyst greatly facilitates movement of the oxidant stream into and through the cathode flow field 26. Otherwise, forcing an oxidant stream through a multiplicity of narrow passages to pass through a fuel cell requires substantial parasitic power from the fuel cell power plant, and decreases efficiencies inherent to an ambient pressure fuel cell power plant. Known pressurized fuel cell power plants therefore would not benefit by a cathode inlet having a length substantially the same as a length of a cathode catalyst.

FIG. 4 shows a schematic representation of a first coolant flow field 96, wherein the coolant distribution means includes a first coolant inlet 98 being defined in the first coolant flow field adjacent the cathode inlet 70; a single-path coolant distribution channel 100 defined within the first coolant flow field 96 that directs a coolest portion of the coolant stream passing through the first coolant flow field 96 to pass adjacent to the cathode inlet 70, and along the entire length of the cathode inlet 70; wherein the first coolant flow field 96 is defined in an at least partially porous coolant plate 102. FIG. 4 also shows a first coolant outlet 104 defined in the first coolant flow field 96 adjacent the cathode outlet 72. Because the first coolant flow field 96 is defined in a porous coolant plate 102, the coolant may evaporate from the plate 102 into the humidification zone 78 of the cathode flow field 34. The porous coolant plate 102 provides that the coolant stream within the plate 102 is in fluid communication with at least one of the process reactant streams, being the process oxidant stream within the cathode flow field 26 or the reducing fluid stream within an anode flow field of an adjacent cell (not shown).

For purposes herein, the phrase "coolest portion of the coolant stream passing through the coolant flow field" is meant to identify a portion of the coolant stream that is within one-third of a flow path of the coolant flow field closest to a coolant inlet. For example in the first coolant flow field 96, a first coolant stream flow path is shown by a solid line designated by reference numeral 106 extending from the first coolant inlet 98 to the first coolant outlet 104. The coolest portion of the coolant stream passing through the first coolant flow field 96 is that portion of the coolant stream within the one-third of the total length of the first coolant flow path 106 that is closest to the coolant inlet 98; a warmest portion of the coolant is that portion of the coolant stream within the one-third of the total length of the first coolant flow path 106 farthest from the coolant inlet 98; and, an intermediate temperature portion of the coolant stream is that portion of the coolant stream between the one-third of the total length of the flow path closest to the coolant inlet 98 and the one-third of the total flow path farthest from the coolant inlet 98.

The first flow path 106 of the coolant stream within the first coolant flow field 96 passes through the single-path coolant channel 100 first from the coolant inlet 98 adjacent to the cathode inlet 70, and then in a serpentine course to the first coolant outlet 104. The serpentine course is defined by a first barrier 108 and a second barrier 110. It is to be understood however, that the first coolant flow field 96 may include a plurality of such barriers beyond those shown in FIG. 4, and the first coolant flow path 106 may be further defined by a plurality of coolant flow channels (such as those shown in FIG. 2 at reference numerals 74A, 74B, 74C, 74D) defined within the porous coolant plate 102. FIG. 4 also shows at reference number 112 a line designating an oxidant flow path of the oxidant stream passing through the cathode flow field 26 adjacent the first coolant flow field 96. It is to be understood that the line 112 only represents the oxidant flow path 112, and that the oxidant stream would fill the entire cathode inlet 70 and cathode flow field 26.

FIG. 4 also shows at reference number 114 a line designating a fuel flow path passing through the anode flow field 18 from a fuel inlet 116 to a fuel outlet 118. The anode flow field 18 includes fuel distribution means for directing a fuel stream to flow along the fuel flow path 114 in a direction that is about perpendicular to or substantially across the oxidant flow path 112. As shown schematically in FIG. 4, the fuel distribution means includes a fuel pass barrier 120, and a fuel turn-around 122, and like the coolant distribution means, the fuel distribution means may also include a plurality of fuel barriers and a plurality of fuel flow channels (like the fuel flow channels 64A, 64B, 64C, 64D shown in FIG. 2) that direct the fuel flow path 114 substantially across the oxidant flow path 112. As seen in FIG. 4, the fuel distribution means may provide for directing the fuel stream adjacent the fuel inlet 116 to pass adjacent the coolest portion of the coolant stream passing through the first coolant flow field 96, in order to enhance cooling and therefore raise a relative humidity of the fuel stream. The fuel distribution means may also be structured to reverse the flow of the fuel stream, so that the fuel inlet 114 becomes a fuel outlet, and in such a disposition of the fuel distribution means, the coolant distribution means will direct the coolest portion or the intermediate temperature portion of the coolant stream within the first coolant flow field 96 to pass adjacent the fuel stream inlet 116.

Figure 5:
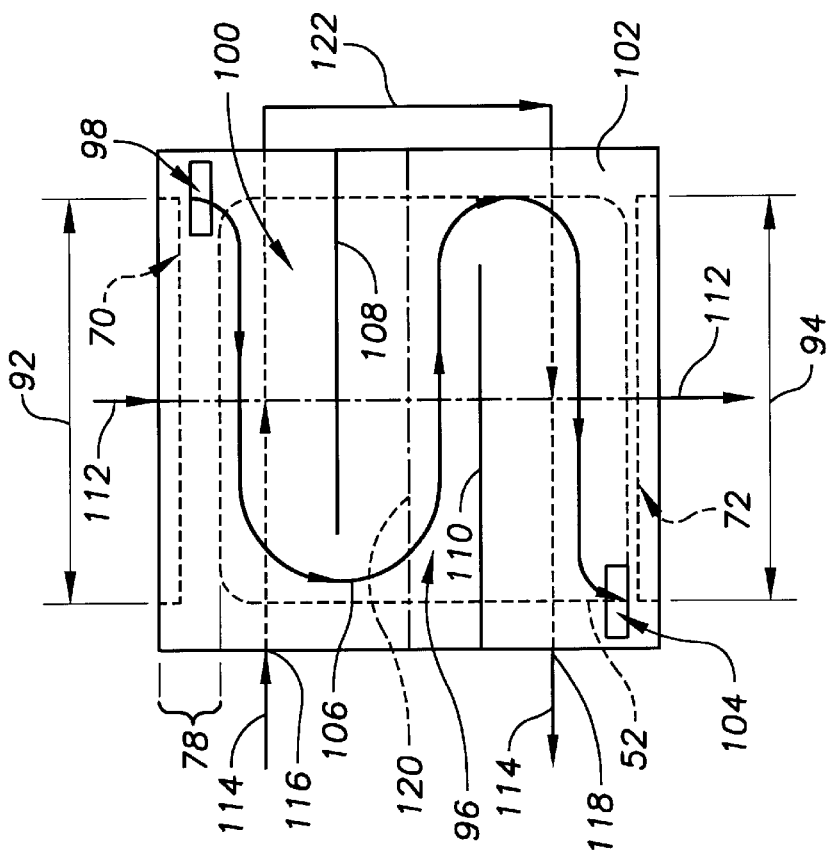
FIG. 5 is a schematic, cross section of a second coolant flow field showing a split-path coolant distribution channel directing flow of a coolant stream through the second coolant flow field, and showing in hatched lines an oxidant flow path and a fuel flow path.

FIG. 5 shows a schematic representation of a second coolant flow field 124. For purposes of efficiency, where components of FIG. 5 are the same as equivalent components in FIG. 4, the reference numerals used in FIG. 5 are a single prime of the reference numerals used in FIG. 4, wherein for example the oxidant fuel path 112 in FIG. 4 will be designated in FIG. 5 as 112'. In the second coolant flow field 124, the coolant distribution means includes a split-path coolant distribution channel 126 defined within the second coolant flow field 124 that directs some of the coolest portion of the coolant stream within the second coolant flow field 124 to pass adjacent to the cathode inlet 70' and to pass along an entire length of the cathode inlet 70', and that also directs some of the coolest portion of the coolant stream within the second coolant flow field 124 to pass adjacent to the cathode outlet 72' and to pass along an entire length of the cathode outlet 72'.

As with the description above of the coolest portion of the coolant stream within the first coolant flow field 96, the coolest portion of the coolant stream within the second coolant flow field 124 is that portion of the coolant stream that is within a one-third of a flow path 128 of the coolant stream within the second coolant flow field 124 that is closest to a second coolant inlet 130 defined within the second coolant flow field 124 adjacent the cathode outlet 72'. The one-third of the flow path 128 closest to the second coolant inlet 130 may be in split, or alternative flow channels of the split-path coolant distribution channel 126. In other words the portions of the coolant stream adjacent to both the cathode inlet 70' and cathode outlet 72' are in the coolest portion of the coolant stream passing through the second coolant flow field 124. FIG. 5 also shows a second coolant outlet 132 defined adjacent the cathode inlet 70'.

As shown in FIG. 5, the split-path coolant distribution channel 126 defines split or alternative paths that direct some of the coolest portion of the coolant stream across the cathode inlet 70' and some of the coolest portion across the cathode outlet 72'. One structure that may achieve that split path is an E-shaped barrier 134 disposed in cooperative association with a third barrier 136 and fourth barrier 138, wherein a top branch and parallel bottom branch of the E-shaped barrier 134 are disposed to run parallel respectively to an axis parallel to the length of the cathode inlet 70' and the length of the cathode outlet 72'; and the third and fourth barriers 136, 138 extend into slots defined by the E-shaped barrier, as shown in FIG. 5. It is to be understood, however, that alternative barriers may be utilized to achieve direction or distribution by the split-path coolant distribution channel 126 of some of the coolest portion of the coolant stream along the entire length of the cathode inlet 70' and some along an entire length of the cathode outlet 72', and that multiple coolant flow channels may be defined within the split-path distribution channel 126.

Figure 6:
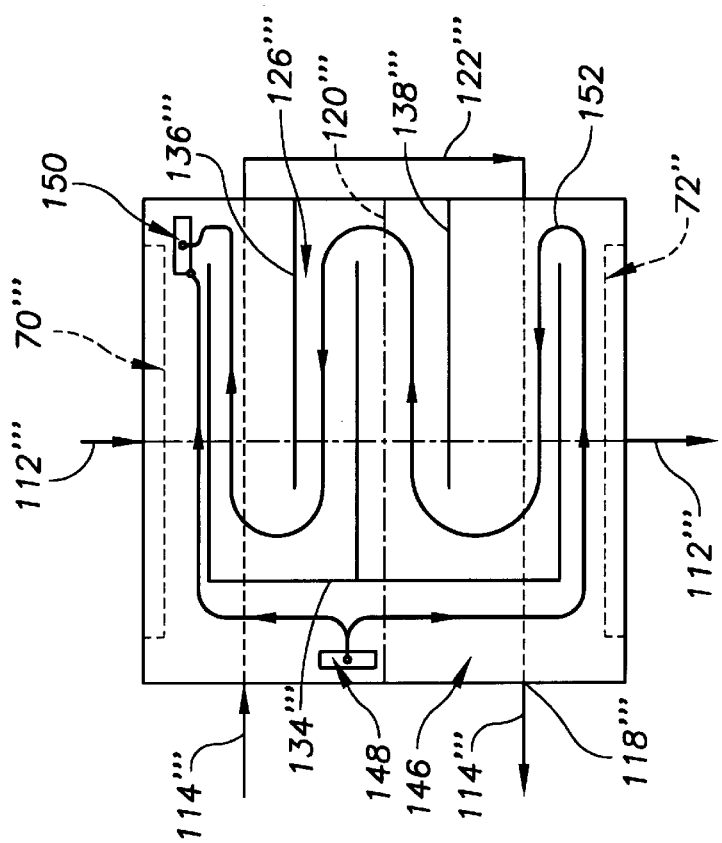
FIG. 6 is a schematic, cross section of a third coolant flow field showing the split-path coolant distribution channel directing flow of a coolant stream through the third coolant flow field, and showing in hatched lines an oxidant flow path and a fuel flow path.

FIG. 6 shows a schematic representation of a third coolant flow field 140. As above, for purposes of efficiency, where components of FIG. 6 are the same as equivalent components in FIG. 4, the reference numerals used in FIG. 6 are double primes of the reference numerals used in FIG. 4 or FIG. 5. For example the oxidant fuel path 112 of FIG. 4 will be designated in FIG. 6 as 112", and the third barrier 136 of FIG. 5 will be designated in FIG. 6 as 136". The third coolant flow field 140 is similar to the second coolant flow field 124 except that a third coolant inlet 142 is defined within the third coolant flow field adjacent the cathode inlet 70", and a third coolant outlet 144 is also defined adjacent the cathode inlet 70". Like the second coolant flow field 124, in the third coolant flow field 140 the coolant distribution means also includes a split-path coolant distribution channel 126" defined within the third coolant flow field 140 that directs some of the coolest portion of the coolant stream within the third coolant flow field 140 to pass adjacent to the cathode inlet 70" and to pass along an entire length of the cathode inlet 70", and that also directs some of the coolest portion of the coolant stream within the third coolant flow field 140 to pass adjacent to the cathode outlet 72" and to pass along an entire length of the cathode outlet 72".

By positioning the third coolant inlet 142 adjacent the cathode inlet 70", the third coolant flow field 140 defines a fourth coolant flow path 145 that both distributes a colder portion of the coolant stream directly to the cathode inlet 70" than does the flow path 128 of the second coolant flow field 124, and also the third coolant flow field 140 delivers some of the coolest portion of the coolant stream to the pass adjacent the cathode outlet 72" thereby providing greater cooling to the cathode outlet 72" than does the flow path 106 of the first coolant flow field 96. As is apparent, the various embodiments of the coolant flow field 34 and its coolant distribution means provide for varying humidification capacities to match varying fuel cell power plant requirements, without recourse to complicated valves, pipes and/or pumps, etc.

Figure 7:
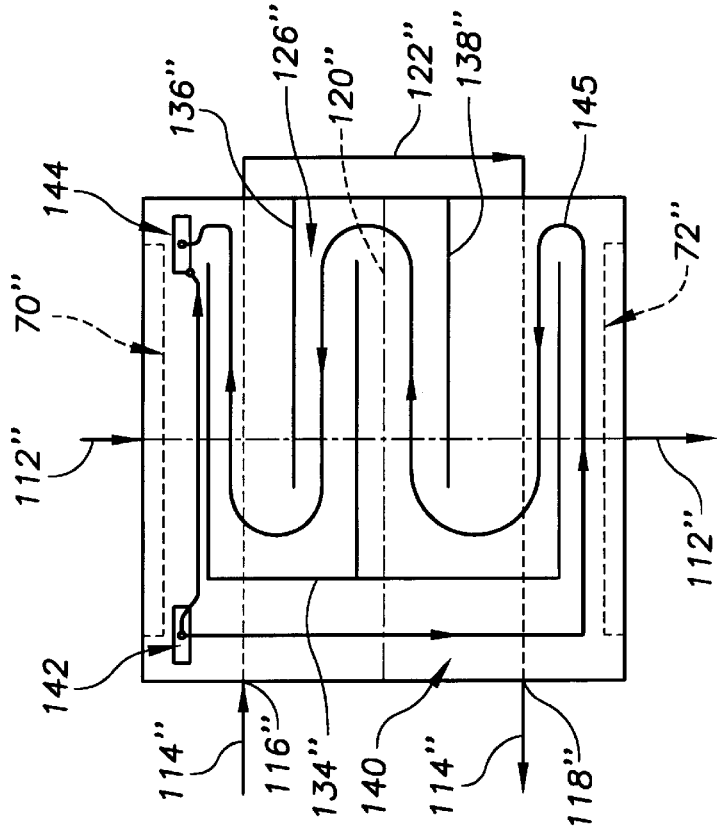
FIG. 7 is a schematic, cross section of a fourth coolant flow field showing the split-path coolant distribution channel directing flow of a coolant stream through the fourth coolant flow field, and showing in hatched lines an oxidant flow path and a fuel flow path.

FIG. 7 shows a schematic representation of a fourth coolant flow field 146. As described above, for purposes of efficiency, where components of FIG. 7 are the same as equivalent components in FIGS. 4, 5 or 6, the reference numerals used in FIG. 7 are triple primes of the reference numerals used in FIGS. 4, 5 or 6. The fourth coolant flow field 146 is similar to the third coolant flow field 140 except that a fourth coolant inlet 148 is defined within the fourth coolant flow field 146 about mid-way between the cathode inlet 70'" and the cathode outlet 72'" and a fourth coolant outlet 150 is also defined adjacent the cathode inlet 70'". Like the third coolant flow field 140, with the fourth coolant flow field 146 the coolant distribution means also includes a split-path coolant distribution channel 126'" defined within the fourth coolant flow field 146 that directs some of the coolest portion of the coolant stream within the fourth coolant flow field 146 to pass adjacent to the cathode inlet 70'" and to pass along an entire length of the cathode inlet 70'", and that also directs some of the coolest portion of the coolant stream within the fourth coolant flow field 146 to pass adjacent to the cathode outlet 72'" and to pass along an entire length of the cathode outlet 72'". The fourth coolant flow field 146 provides for a fourth coolant flow path 152 that directs portions of the coolant stream having about the same temperature to pass adjacent the cathode inlet 70'" and cathode outlet 72'", thereby affording even greater flexibility in distribution of coolant streams of specific cooling capacities without recourse to complicated, heavy, expensive valves, piping and/or pumps. The second coolant flow field 124, third coolant flow field 140 and fourth coolant flow field 146 may be defined in porous or sealed coolant plates.

In use of the humidification system 10 for a fuel cell power plant, the coolant flow field 34 may be selected from the first 96, second 124, third 140 or fourth 146 coolant flow fields prior to manufacture of the plant to satisfy humidification requirements of a specific fuel cell power plant. For example, if a fuel cell power plant is to be utilized in a transportation vehicle being exposed to environmental weather conditions ranging from sub-freezing ambient temperatures to above 100 degrees fahrenheit dry air, than an appropriate fuel cell means may require an anti-freeze liquid coolant within a sealed coolant flow field 84, with a maximum cooling of the cathode inlet 70, such as achieved by the third coolant flow field 140. Such a fuel cell means may also benefit from a substantial humidification zone 78 to minimize water loss from a PEM electrolyte as the process oxidant stream is cooled within and adjacent the cathode inlet 70.

In contrast, if the fuel cell power plant is to be a stationary power plant operating in a humid environment having no sub-freezing temperatures, the fuel cell means may operate best with a coolant flow field defined within the porous coolant plate 102 and having a single path coolant channel such as in the first coolant flow field 96, thereby enhancing necessary humidification of the process oxidant stream in and adjacent the cathode inlet 70 while minimizing coolant stream requirements. If the fuel cell power plant is in a fixed location, such as with the stationery power plant where a non-plant sourced water supply is readily available, requirements for condensing water from the fuel exiting the fuel outlet 118 would be insubstantial, and therefore, a coolant flow field 134 could be utilized that concentrates flow of the coolant stream adjacent the cathode inlet 70 and/or cathode outlet 72.

In contrast, if the power plant is to power a transportation vehicle wherein all water for both cooling the fuel cell means and for reforming a hydrocarbon fuel must be recovered from water generated at the cathode catalyst so that the plant is self-sufficient in water, cooling of the fuel adjacent the fuel outlet 118 and the oxidant stream adjacent the cathode outlet 72 would be critical to facilitate condensation and recovery of water in the fuel and oxidant streams. For such a fuel cell power plant, a coolant flow field 34 and a fuel flow path 114 would be selected to enhance cooling adjacent the cathode outlet 72 and fuel outlet 118, such as achieved by the second coolant flow field 124, or by the fourth coolant flow field 146. It can be seen that both the second and fourth coolant flow fields 124, 146 direct the coolest portions of the coolant stream within the second and fourth coolant flow fields to both their respective fuel outlets 118', 118''', and to their cathode outlets 72', 72''', however the fourth coolant flow field 146 directs a cooler portion of the coolant stream to flow adjacent the cathode inlet 70''' than does the second coolant flow field 124, and hence the fourth coolant flow field 146 may be a desired coolant flow field 34 for specific operating environments of the humidification system 10 for a particular fuel cell power plant.

It is apparent therefore that the humidification system 10 for a fuel cell power plant of the present invention provides substantial flexibility in satisfying humidification requirements for an ambient pressure fuel cell, thereby improving cell performance and longevity of a PEM electrolyte of the cell without any complicated, heavy, and difficult to operate pumps, valves, and related piping common and necessary in known fuel cell power plants that endeavor to optimize process oxidant stream humidity.

While the present invention has been described and illustrated with respect to a particular construction and method of use of the humidification system 10 for a fuel cell power plant, it is to be understood that the humidification system 10 is not to be limited to the described and illustrated embodiments. For example the coolant flow field 34 has been described above with a coolant distribution means defining four exemplary coolant flow paths, however the coolant distribution means may include any known structures commonly utilized to direct flow of a fluid as described within the coolant flow field 34. Accordingly, reference should be made primarily to the following claims rather than the foregoing description to determine the scope of the invention.

What is claimed is:

1. A humidification system for a fuel cell power plant that generates electrical energy from a reducing fluid and a process oxidant stream, the system comprising:
   a. at least one fuel cell for producing the electrical energy from the reducing fluid and process oxidant stream, the fuel cell including a proton exchange membrane electrolyte between an anode and cathode catalyst, a cathode flow field adjacent the cathode catalyst extending between a cathode inlet and a cathode outlet for directing the process oxidant stream to pass adjacent the cathode catalyst, wherein the proton exchange membrane electrolyte extends between an entry edge of the cathode inlet and the cathode outlet, the cathode catalyst extends from about the cathode outlet to a point between the entry edge of cathode inlet and the cathode outlet, so that a humidification zone within the cathode flow field substantially overlies the portion of the proton exchange membrane electrolyte extending between the entry edge of the cathode inlet and the point between the entry edge of the cathode inlet and cathode outlet to which the cathode catalyst extends;
   b. a coolant flow field adjacent the cathode flow field including a coolant inlet, a coolant outlet, and coolant distribution means between the coolant inlet and coolant outlet for directing at least some of a coolest portion of a coolant stream within the coolant flow field to flow along an entire length of the cathode inlet to cool the process oxidant stream adjacent the cathode inlet, wherein the entire length of the cathode inlet is about the same as a length axis of the cathode catalyst that passes through a shortest distance across the cathode catalyst perpendicular to a width axis of the cathode catalyst, which width axis is a shortest distance between the cathode flow field and the anode catalyst, and perpendicular to flow of the process oxidant stream through the cathode flow field from the cathode inlet to the cathode outlet; and,
   c. a pressure control means secured to a coolant line that supplies the coolant stream to the coolant flow field for maintaining a positive pressure differential between the process oxidant stream within the cathode flow field and the coolant stream within the coolant flow field so that the coolant stream within the coolant flow field is at a pressure that is lower than a pressure of the process oxidant stream within the cathode flow field.

2. The humidification system for a fuel cell power plant of claim 1, wherein the coolant flow field is defined within a porous coolant plate so that the coolant stream is in fluid communication with the reducing fluid or process oxidant stream.

3. The humidification system for a fuel cell power plant of claim 1, wherein the coolant distribution means includes a split-path coolant distribution channel that directs some of the coolest portion of the coolant stream within the coolant flow field to pass adjacent the cathode inlet, and directs some of the coolest portion of the coolant stream within the coolant flow field to pass adjacent the cathode outlet.

4. The humidification system for a fuel cell power plant of claim 3, wherein the split-path coolant distribution channel directs some of the coolest portion of the coolant stream within the coolant flow field to pass along an entire length of the cathode outlet, wherein the entire length of the cathode outlet is about the same as the entire length of the cathode inlet.

5. The humidification system for a fuel cell power plant of claim 4, wherein the coolant inlet is defined adjacent the cathode outlet, and the coolant outlet is defined adjacent the cathode inlet.

6. The humidification system for a fuel cell power plant of claim 4, wherein the coolant inlet is defined adjacent the cathode inlet, and the coolant outlet is defined adjacent the cathode inlet.

7. The humidification system for a fuel cell power plant of claim 4, wherein the coolant inlet is defined about mid-way between the cathode inlet and the cathode outlet, and the coolant outlet is defined adjacent the cathode inlet.

8. A humidification system for a fuel cell power plant that generates electrical energy from a reducing fluid and a process oxidant stream, the system comprising:
   a. at least one fuel cell for producing the electrical energy from the reducing fluid and process oxdent stream, the fuel cell including an electrolyte between an anode and cathode catalyst, a cathode flow field adjacent the cathode catalyst extending between a cathode inlet and a cathode outlet for directing the process oxidant stream to pass adjacent the cathode catalyst; and,
   b. a coolant flow field adjacent the cathode flow field including a coolant inlet, a coolant outlet, and coolant distribution means between the coolant inlet and coolant outlet for directing a coolant stream to flow between the coolant inlet and outlet, the coolant distribution means including a split path coolant distribution channel that directs some of the coolest portion of the coolant stream within the coolant flow field to pass along an entire length of the cathode inlet, and directs some of the coolest portion of the coolant stream within the coolant flow field to pass adjacent the cathode outlet, wherein the entire length of the cathode inlet is about the same as a length axis of the cathode catalyst that passes through a shortest distance across the cathode catalyst perpendicular to a width axis of the cathode catalyst, which width axis is a shortest distance between the cathode flow field and the anode catalyst, and perpendicular to flow of the process oxidant stream through the cathode flow field from the cathode inlet to the cathode outlet.

9. The humidification system for a fuel cell power plant of claim 8, wherein the coolant flow field is defined within a porous coolant plate so that the coolant stream is in fluid communication with the process oxidant stream.

10. The humidification system for a fuel cell power plant of claim 8, wherein the electrolyte is a proton exchange membrane that extends between an entry edge of the cathode inlet and the cathode outlet, the cathode catalyst extends from about the cathode outlet to a point between the entry edge of cathode inlet and the cathode outlet, so that a humidification zone within the cathode flow field substantially overlies the portion of the proton exchange membrane electrolyte extending between the entry edge of the cathode inlet and the point between the entry edge of the cathode inlet and cathode outlet to which the cathode catalyst extends.

11. The humidification system for a fuel cell power plant of claim 8 wherein the split-path coolant distribution channel directs some of the coolest portion of the coolant stream within the coolant flow field to pass along an entire length of the cathode outlet, wherein the entire length of the cathode outlet is about the same as the entire length of the cathode inlet.

12. The humidification system for a fuel cell power plant of claim 8, wherein the coolant inlet is defined adjacent the cathode outlet, and the coolant outlet is defined adjacent the cathode inlet.

13. The humidification system for a fuel cell power plant of Claim 8, wherein-the coolant inlet is defined adjacent the cathode inlet, and the coolant outlet is defined adjacent the cathode inlet.

14. The humidification system for a fuel cell power plant of claim 8, wherein the coolant inlet is defined about mid-way between the cathode inlet and the cathode outlet, and the coolant outlet is defined adjacent the cathode inlet.

15. The humidification system for a fuel cell power plant of claim 8, wherein the fuel cell includes an anode flow field adjacent the anode catalyst extending between a fuel inlet and a fuel outlet and including a fuel distribution means for directing a fuel stream of the reducing fluid to pass adjacent the anode catalyst along a fuel flow path in a direction that is about perpendicular to an oxidant flow path of the process oxidant stream passing through the cathode flow field and for directing the fuel stream adjacent the fuel inlet to pass adjacent the coolest or intermediate temperature portion of the coolant stream passing through the coolant flow field.

16. A method of increasing relative humidity of a process oxidant stream within a cathode flow field of a fuel cell for generating electrical energy from a reducing fluid and a process oxidant stream, the fuel cell including an electrolyte between and anode and cathode catalyst, the cathode flow field being positioned adjacent the cathode catalyst and extending between a cathode inlet and a cathode outlet for directing the process oxidant stream to pass adjacent the cathode catalyst, the method comprising the steps of:

a. positioning a coolant flow field adjacent the cathode flow field so that the coolant flow field extends between a coolant inlet and a coolant outlet; and b. passing a coolant stream through a split-path coolant distribution channel within the coolant flow field so that some of a coolest portion of the coolant stream passes along an entire length of the cathode inlet, and some of the coolest portion of the coolant stream passes adjacent the cathode outlet, wherein the entire length of the cathode inlet is about the same as a length axis of the cathode catalyst that passes through a shortest distance across the cathode catalyst perpendicular to a width axis of the cathode catalyst, which width axis is a shortest distance between the cathode flow field and the anode catalyst, and perpendicular to flow of the process oxidant stream through the cathode flow field from the cathode inlet to the cathode outlet.

* * * * *